(12) United States Patent
Wang

(10) Patent No.: US 9,435,364 B2
(45) Date of Patent: Sep. 6, 2016

(54) TELESCOPIC SUPPORTING DEVICE AND TELESCOPIC SUPPORTING POST

(71) Applicant: Chun-Tsair Wang, Taichung (TW)

(72) Inventor: Chun-Tsair Wang, Taichung (TW)

( * ) Notice: Subject to any disclaimer, the term of this patent is extended or adjusted under 35 U.S.C. 154(b) by 0 days.

(21) Appl. No.: 14/850,968

(22) Filed: Sep. 11, 2015

(65) Prior Publication Data

US 2016/0102693 A1 Apr. 14, 2016

(30) Foreign Application Priority Data

Oct. 9, 2014 (TW) .............................. 103218060 U

(51) Int. Cl.
| | | |
|---|---|---|
| *F16M 11/00* | (2006.01) | |
| *F16B 7/14* | (2006.01) | |
| *F16M 11/28* | (2006.01) | |
| *A47C 19/02* | (2006.01) | |
| *F16M 11/18* | (2006.01) | |

(52) U.S. Cl.
CPC ............... *F16B 7/14* (2013.01); *A47C 19/024* (2013.01); *F16M 11/18* (2013.01); *F16M 11/28* (2013.01)

(58) Field of Classification Search
USPC ....... 248/157, 161, 407, 408, 409, 410, 411, 248/412, 413, 414, 406.1, 513, 125.8, 248/125.9; 108/147.19, 147.2, 147.21
See application file for complete search history.

(56) References Cited

U.S. PATENT DOCUMENTS

| | | | | |
|---|---|---|---|---|
| 4,105,346 A * | 8/1978 | Gelinas | ................. | F16B 7/1427 16/429 |
| 7,587,872 B2 * | 9/2009 | Kodi | ....................... | E04C 5/206 52/126.1 |
| 7,966,777 B2 * | 6/2011 | Douglas | ................ | E04H 12/182 52/110 |
| 9,204,715 B2 * | 12/2015 | Bonuccelli | ............... | A47B 9/20 |
| 2003/0168557 A1 * | 9/2003 | Semienko | ................ | A47C 3/18 248/157 |
| 2005/0082443 A1 * | 4/2005 | Hogle | ..................... | B63B 29/06 248/161 |
| 2008/0121150 A1 * | 5/2008 | Picchio | .................... | A47B 9/04 108/147.19 |

\* cited by examiner

*Primary Examiner* — Steven Marsh
(74) *Attorney, Agent, or Firm* — Wang Law Firm, Inc.

(57) ABSTRACT

A telescopic supporting device is provided, which includes a plurality of hollow kits and a plurality of stoppers. Each of the plurality of hollow kits has the same outline but different size. The plurality of first grooves are provided on the outer wall. The plurality of second grooves are provided on the inner wall. Each of the plurality of first grooves and each of the plurality of second grooves are adjacent to each other and are alternatively configured on each of the plurality of hollow kits. Each of the plurality of first grooves of each of the plurality of hollow kits of inner side is correspondingly combined with each adjacent one of the plurality of second grooves of each of the plurality of hollow kits of outer side to form a plurality of stopper containing parts.

6 Claims, 4 Drawing Sheets

TELESCOPIC SUPPORTING DEVICE AND TELESCOPIC SUPPORTING POST

CROSS-REFERENCE TO RELATED APPLICATION

This application claims priority from Taiwan Patent Application No. 103218060, filed on Oct. 9, 2014, in the Taiwan Intellectual Property Office, the contents of which are hereby incorporated by reference in their entirety for all purposes.

BACKGROUND OF THE INVENTION

1. Field of the Invention

The present invention relates to a telescopic supporting device and the application of the telescopic supporting post of the telescopic supporting device.

2. Description of the Related Art

Each user has different stature. However, most of the current furnitures or office tables and chairs are fixedly arranged in height, and the users have to adapt or adjust himself to fit the existing height of the furnitures. This will easily cause physical discomfort for long-term use. The structure of telescopic supporting post meets the requirement of height adjustment and also has an advantage of ease of storage. But it is implicit a disadvantage that the stability of the telescopic supporting post can be maintaining at a certain length when the telescopic supporting post is stretching.

When an actuator is used to stretch the telescopic device, a structural design which prevents from loosening during twisting is used. Thus, most of the appearance of the telescopic post is square shape. The property of being difficult to be twisted of the square shape is used to reduce torsion generated due to external stress. However, the use of square shape post limits the surface area of contacting the supporting structure. Also, as the shape of the cross section of the post has edge angles, it will easily cause injury if the users hit the post accidentally. It is difficult to assemble quickly and to carry out matching of the overall landscaping because it is easily limited by angles during installation and assembly.

For the overall consideration, using cylinder is a better choice as it bears a greater stress; it is more convenient for the manufacturing process and it facilitates the matching of the overall landscaping. However, the cylinder is unable to resist the torsion and its development is thus limited.

In conclusion, the inventor of the present invention has designed a telescopic supporting device through years of painstaking research and thinking to improve the shortcomings in connection with the conventional techniques and thus enhance the implementation and the application in the industry.

SUMMARY OF THE INVENTION

To achieve the foregoing objective, the present invention provides a telescopic supporting device which includes a plurality of hollow kits and a plurality of stoppers. Each of the plurality of hollow kits includes an outer wall, an inner wall. A plurality of first grooves are provided on the outer wall, and a plurality of second grooves are provided on the inner wall. Each of the plurality of hollow kits has the same outline but a different size and each of the plurality of hollow kits is sequentially engaged and sleeved within one another. Each of the plurality of first grooves and each of the plurality of second grooves are adjacent to each other and are alternatively configured on each of the plurality of hollow kits. Each of the plurality of first grooves of each of the plurality of hollow kits of inner side is correspondingly combined with each adjacent one of the plurality of second grooves of each of the plurality of hollow kits of outer side to form a plurality of stopper containing parts. The plurality of stoppers are disposed in the plurality of stopper containing parts. The shapes of cross sections of the plurality of stoppers correspond to outlines of the plurality of stopper containing parts. The plurality of stoppers prevent the two adjacent hollow kits from generating rotation.

Preferably, the outline of each of the plurality of stopper containing parts may be geometric figure of non-conic curve.

Preferably, the telescopic supporting device of the present invention may further include an actuating device. The actuating device allows each of the plurality of hollow kits extending and retracting relative to an axial direction.

Preferably, the plurality of stopper containing parts may be symmetrically configured.

Preferably, each of the plurality of stoppers has a positioning part at a side surface which is contact with the plurality of stopper containing parts.

To achieve the foregoing objective, the present invention further provides a telescopic supporting post which includes a supporting platform, a telescopic supporting device which couples to the supporting platform and an actuating device which is disposed within the telescopic supporting device. The actuating device may allow the telescopic supporting device described above to extend and retract relative to the linear axial direction, such that the telescopic supporting device is used to support the supporting platform.

The present invention has following advantages. First, the shape of cross section of the stopper disposed in the middle of the hollow kits may be square shape which may effectively save the costs of stock preparation of components and reduce the production costs. And the square shape of the stopper may also play a role to resist torsion and thus the appearance of hollow post may be unlimited. This means that the appearance of hollow post can be made into cylinder to enhance the application in the industry. Second, the position of disposing grooves in the hollow post may be alternatively configured to reduce the grooves damaging the supporting strength of the hollow post. The grooves may also be symmetrically configured to disperse the point of application of the stress and the extent of increase of stress.

DETAILED DESCRIPTION OF THE PREFERRED EMBODIMENTS

In order to facilitate the understanding of the features, the contents and the advantages of the present invention, and the effectiveness thereof that can be achieved, the present invention will be illustrated in detail below through embodiments with reference to the accompanying drawings. On the other hand, the diagrams used herein are merely intended to be schematic and auxiliary to the specification, but are not necessary to be true scale and precise configuration after implementing the present invention. Thus, it should not be interpreted in accordance with the scale and the configuration of the accompanying drawings to limit the scope of the present invention on the practical implementation.

Figure 1:
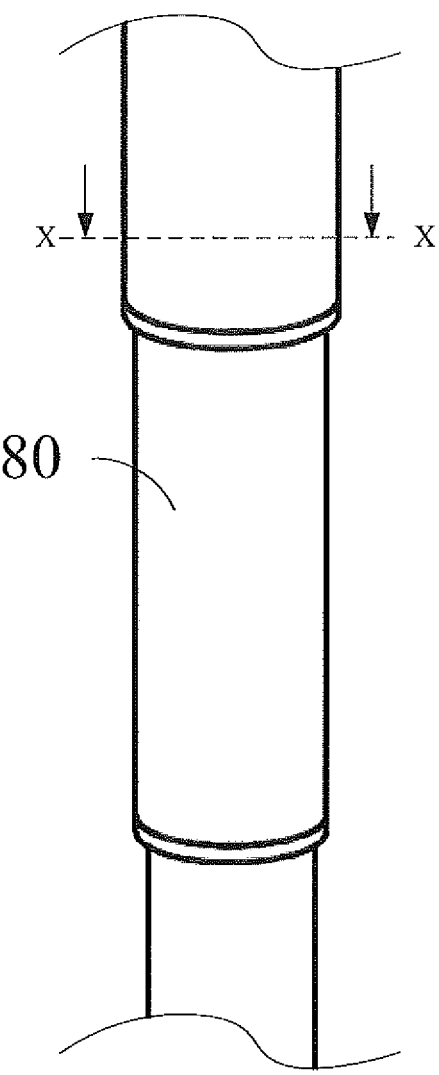
FIG. 1 is a three dimensional assembly diagram of the telescopic supporting device of the present invention.
Figure 2:
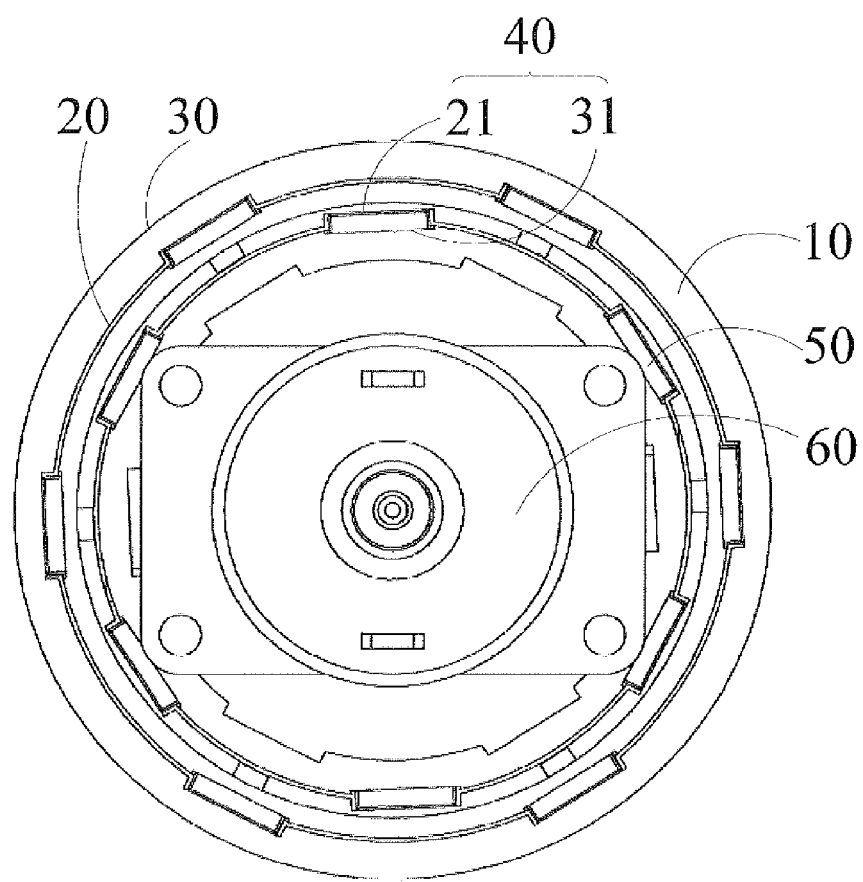
FIG. 2 is a sectional view along a line X-X of FIG. 1.

Please refer to FIG. 1 and FIG. 2, which are a three dimensional assembly diagram and a sectional schematic view of the telescopic supporting device of the present invention. In the figures, a telescopic supporting device 80 includes a plurality of hollow kits 10 and a plurality of stoppers 50. Each of the plurality of hollow kits 10 may include an outer wall 20 and an inner wall 30, a plurality of first grooves 21 are provided on the outer wall 20, and a plurality of second grooves 31 are provided on the inner wall 30. Each of the plurality of hollow kits 10 has the same outline but different size such that each of the plurality of hollow kits 10 may be sequentially engaged and sleeved within one another.

Each of the plurality of first grooves 21 of each of the plurality of hollow kits 10 of inner side is correspondingly combined with each adjacent one of the plurality of second grooves 31 of each of the plurality of hollow kits 10 of outer side to form a plurality of stopper containing parts 40. Each of the plurality of first grooves 21 and each of the plurality of second grooves 31 are adjacent to each other and are alternatively configured on each of the plurality of hollow kits 10 to reduce the first grooves 21 and the second grooves 31 damaging the supporting strength of the hollow post. The adjacent first grooves 21 and second grooves 31 may also be symmetrically configured to disperse the point of application of the stress and the extent of increase of stress.

The plurality of stoppers 50 may be correspondingly disposed in the plurality of stopper containing parts 40. The shapes of cross sections of the plurality of stoppers 50 correspond to outlines of the stopper containing parts 40. The outline of the stopper containing parts 40 may be geometric figure of non-conic curve to prevent each of the two adjacent hollow kits 10 from generating a relative rotation. Since both sides of the hollow kit 10 have a corresponding groove which contacts with the stopper 50, the maximum static friction force between the stopper 50 and the hollow post may be increased to prevent torsion.

An actuating device 60 may be used such that the hollow kits 10 may extend and retract relative to the linear axial direction to perform stretching and may be engaged by the stopper containing parts 40 formed by associating with the stoppers 50 and the plurality of hollow kits 10 described above to favorably enable the function of supporting after stretching the plurality of hollow kits 10.

For implementation, the shape of cross section of the used stoppers 50 may be square shape which may effectively save the costs of stock preparation of components and reduce the production costs. Furthermore, square shape may also play a role to resist torsion and thus the appearance of hollow post may be unlimited. This means that it can be made into cylinder to enhance the application in the industry. Cylinder bears a greater stress; it is more convenient for the manufacturing process and it facilitates the matching of the overall landscaping.

Figure 3:
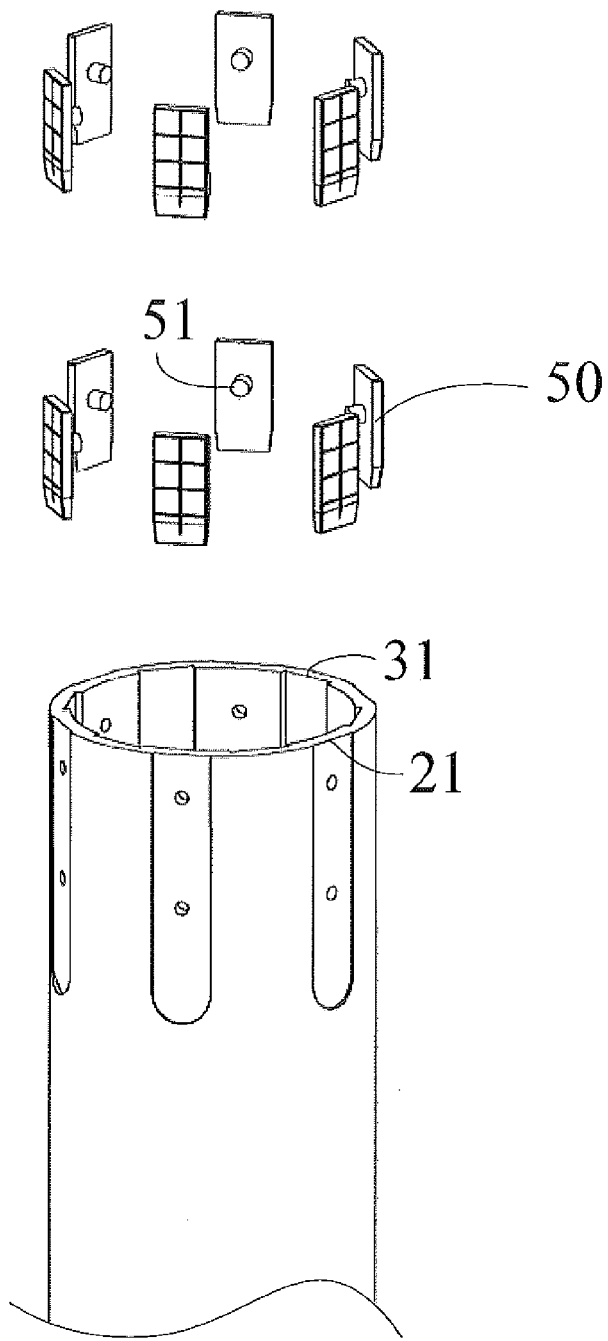
FIG. 3 is a schematic diagram of the structure of the stopper of the telescopic supporting device of the present invention.

Please refer to FIG. 3, which is a schematic diagram of the structure of the stopper of the telescopic supporting device of the present invention. In the figure, a positioning part 51 is disposed at one side of each stopper 50 and a non-slip part is disposed at the other side of each stopper 50. Such that the positioning part 51 may be fixed on the first grooves 21 of the contact surfaces of the stopper containing part 40, and the frictional force may be increased by contacting the non-slip part with the second grooves 31 or disposing the plurality of stoppers 50 on the stopper containing parts 40. The positions where the positioning part 51 and the non-slip part described above are located on the first grooves 21 or the second grooves 31 are not limited thereto.

Figure 4:
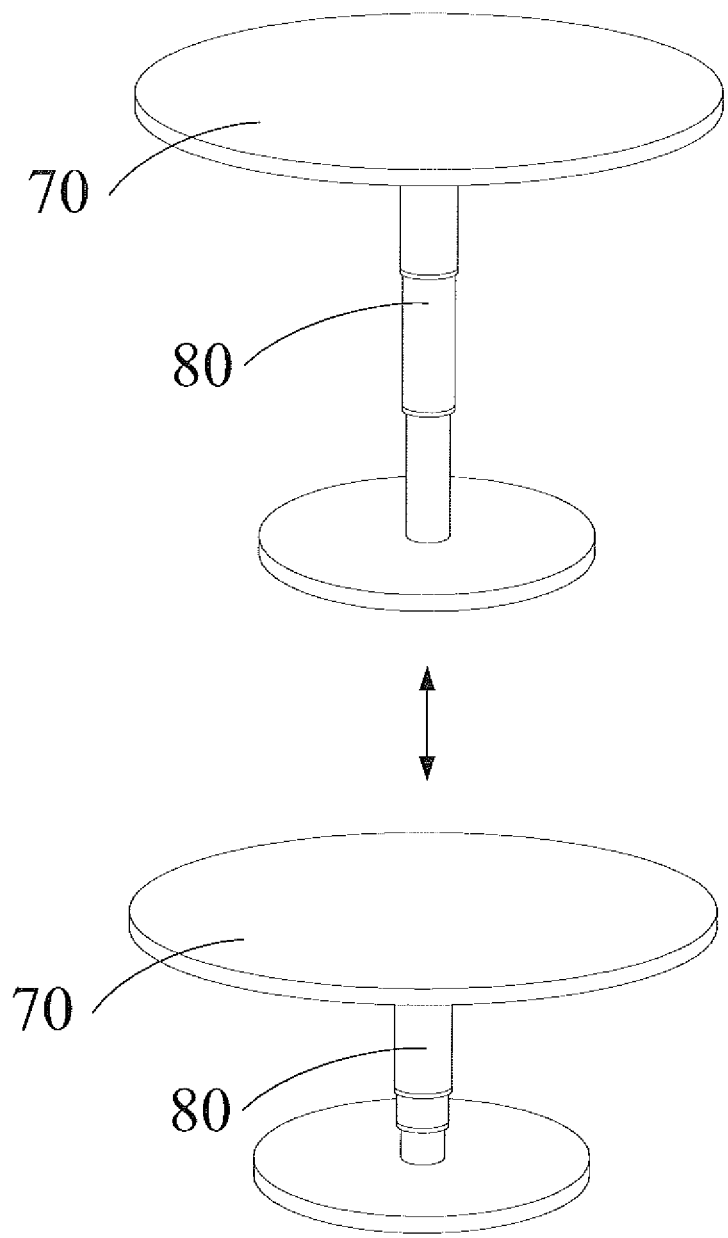
FIG. 4 is a schematic diagram of the embodiments of the telescopic supporting post of the present invention.

Please refer to FIG. 4, which is a schematic diagram of the embodiments of the telescopic supporting post of the present invention. In the figure, it is a telescopic supporting post which is formed of a supporting platform 70, a telescopic supporting device 80 which couples to the supporting platform 70 and an actuating device 60 which is disposed within the telescopic supporting device 80. The actuating device 60 may allow the telescopic supporting device 80 to extend and retract relative to the linear axial direction, such that the telescopic supporting device 80 is used to support the supporting platform 70 and thus be applicable to the use of table legs and bed legs.

The specific embodiments provided in the detailed illustration of the preferred embodiments are merely to facilitate the description of the technical content of the present invention, rather than restricting the present invention to the embodiments described above in a narrow sense. Various changes of implementation made are within the scope of the present invention without departing from the spirits and the following appended claims of the present invention.

What is claimed is:

1. A telescopic supporting device, comprising:
   a plurality of hollow kits, each of the plurality of hollow kits comprising an outer wall and an inner wall, a plurality of first grooves being provided on the outer wall, a plurality of second grooves being provided on the inner wall, each of the plurality of hollow kits having a same outline but different size, and each of the plurality of hollow kits being sequentially engaged and sleeved within one another, each of the plurality of first grooves and each of the plurality of second grooves being adjacent to each other and alternatively configured on each of the plurality of hollow kits, each of the plurality of first grooves of each of the plurality of hollow kits of inner side being correspondingly combined with each adjacent one of the plurality of second grooves of each of the plurality of hollow kits of outer side to form a plurality of stopper containing parts; and
   a plurality of stoppers, disposed in the plurality of stopper containing parts, shapes of cross sections of the plurality of stoppers being corresponding to outlines of the plurality of stopper containing parts;
   wherein the plurality of stoppers prevent the two adjacent hollow kits from generating a relative rotation.

2. The telescopic supporting device of claim 1, wherein the outline of each of the plurality of stopper containing parts is a geometric figure of non-conic curve.

3. The telescopic supporting device of claim 1, further comprising an actuating device, wherein the actuating device allows each of the plurality of hollow kits to extend and retracting relative to an axial direction.

4. The telescopic supporting device of claim 1, wherein the plurality of stopper containing parts are symmetrically configured.

5. The telescopic supporting device of claim 1, wherein each of the plurality of stoppers has a positioning part at a side surface being in contact with the plurality of stopper containing parts.

6. A telescopic supporting post, comprising:
   a supporting platform;

a telescopic supporting device described in claim 1, coupling to the supporting platform;
and
an actuating device, disposed within the telescopic supporting device;
wherein the actuating device allows the telescopic supporting device to extend and retract relative to a linear axial direction, such that the telescopic supporting device is used to support the supporting platform.

* * * * *